UNITED STATES PATENT OFFICE.

BOTHO SCHWERIN, OF FRANKFORT-ON-THE-MAIN, GERMANY.

METHOD OF SEPARATING SUBSTANCES IN SUSPENSION BY WASHING.

1,029,579. Specification of Letters Patent. Patented June 11, 1912.

No Drawing. Application filed August 29, 1911. Serial No. 646,746.

*To all whom it may concern:*

Be it known that I, BOTHO SCHWERIN, a subject of the German Emperor, and a resident of Frankfort-on-the-Main, Germany, have invented certain new and useful Improvements in Methods of Separating Substances in Suspension by Washing, of which the following is a specification.

The present invention relates to an improved method of treating a composite mass or body held in suspension in a liquid so that the component parts thereof may be separated one from another.

Practical experience in the treatment of material suspended in water has shown that such material acts as though it were statically charged with electricity, the charge in some instances, or with certain substances, appearing to be negative and in others positive as compared with the water. It is also well known that neutralization of such charges will cause sedimentation or coagulation of substances held in suspension in liquid so that the liquid may be thus clarified as the coagulated material is precipitated therein. Such neutralization may be effected in several ways. For instance, the result described may be obtained by adding to the suspension a suitable electrolyte, which will contain positive ions of salts if the matter in suspension is of an electro-negative nature and negative ions if, on the other hand, the suspension is of an electro-positive character. The purpose and effect of the method hereinafter described is, however, clearly distinguishable from that referred to, although it involves the use of an electrolyte to neutralize the apparent static electric condition of an element or part of a suspension.

There are many substances which are of a composite character and in which the connection between the particles of different nature is so close that it is difficult or impossible to effect a separation of such particles by methods heretofore proposed. Such groups or classes of particles differ frequently in that those of one group appear to possess an electrical charge of opposite polarity to that of the other, or again they may differ as regards their size or fineness.

I have found that the ordinary washing process, which has been found unsuitable for separating substances of the character referred to may be greatly improved, and in fact made ideal in most cases, by adding suitable electrolytes to the substances in suspension, the nature of the electrolyte employed depending upon and having the function of neutralizing the apparent static electric charge of that portion of the substance thereof which it is not desired to separate from the suspension. For example, if the substance in suspension is a mixture of an electro-negative clay and iron ore, the addition of an electrolyte of basic, or electro-positive, nature (for instance hydroxid of sodium) will convert the clay into such a condition that the particles thereof will be retained in a solution condition and not be directly deposited. Under the microscope intense Brownian movements of such particles can be observed. The particles of the oppositely charged iron ore, however, will not be agitated but rapidly separated from the clay and deposited. Or again, if the substance in suspension be a mixture of fine particles of clay and sand the addition of a solution of ammonia will effect a rapid separation of the sand from the clay, causing the sand to be precipitated while retaining the fine particles of clay in suspension.

The substance separated from the suspension by the method described can be withdrawn from the liquid and the matter remaining in suspension subsequently recovered and treated if desired.

Finely divided substances are sometimes more or less indifferently affected by the action of electrolytes and the addition of such an electrolyte alone will not effect the result hereinbefore described. I have found that such substances may be made electrically active by causing them to adsorb colloidal substances of a strong electro-positive or electro-negative character. As examples of substances of this character, hereinafter referred to as non-neutral colloidal bodies, may be noted humic acid, silicic acid, aluminum hydroxid, etc. By the aid of such a non-neutral collodial body the action of the proper electrolyte upon the otherwise indifferent substance will be as described when referring to substances which are naturally either strongly electro-positive or electro-negative in character.

The amount of electrolyte required for carrying out the method hereinbefore described is ordinarily small. For example, in treating ten kilograms of a body of intimately mixed clay, sand, etc., which are in suspension in twenty liters of water an addition of five cubic centimeters of a 25% solution of ammonia is sufficient to effect the desired separation of the sand, etc., from the fine clay.

I am aware that heretofore acids and alkalis have been added to substances for various purposes but believe myself to be the first to have employed an electrolyte for the purpose of separating substances, or to have discovered that composite substances may be separated in the manner described.

It has been proposed to add an acid as, for instance, acetic acid to solutions of kaolin in order to precipitate the solids; salts or alkalis or lime have been added to peat to improve the quality thereof and soda has been added to faience, porcelain or chamotte in order to bring the material into proper condition for molding. It has also been recognized that finely divided substances are made more adaptable for suspension by adding thereto suitable electrolytes and as hereinbefore noted such electrolytes have been added to substances held in suspension to coagulate and precipitate such substances, for the purpose of clearing the water or recovering the suspended matter, or both. It will be observed, however, that the method hereinafter claimed does not involve the coagulation of suspended matter for the purpose of precipitating it but rather the disintegration or breaking up of a composite or coagulated substance into its component parts and causing one of said parts to be retained in suspension, while another separates therefrom.

Having thus described the invention, what is claimed and desired to be secured by Letters-Patent is:

The herein described method of separating substances held in suspension in liquid, which consists in adding to the liquid containing a plurality of solids in mechanical suspension, a strongly non-neutral colloidal body, and an electrolyte capable of neutralizing the electrical condition of the substance adsorbing the colloidal body, whereby said substance will be caused to remain in a condition of suspension while another substance separates therefrom.

In testimony whereof I have signed my name to this specification in the presence of two subscribing witnesses.

BOTHO SCHWERIN.

Witnesses:
 FRANZ HASSLACHER,
 ERWIN DIPPEL.